(12) United States Patent (10) Patent No.: US 12,565,122 B2
Ogihara et al. (45) Date of Patent: Mar. 3, 2026

(54) TEMPERATURE ADJUSTING DEVICE AND VEHICLE

(71) Applicant: HONDA MOTOR CO., LTD., Tokyo (JP)

(72) Inventors: Yasushi Ogihara, Wako (JP); Yasuo Yamada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 304 days.

(21) Appl. No.: 18/125,754

(22) Filed: Mar. 24, 2023

(65) Prior Publication Data

US 2023/0311709 A1 Oct. 5, 2023

(30) Foreign Application Priority Data

Mar. 31, 2022 (JP) ................................. 2022-059636

(51) Int. Cl.
　　*B60L 58/27* (2019.01)
　　*B60L 1/08* (2006.01)
(52) U.S. Cl.
　　CPC ................. *B60L 58/27* (2019.02); *B60L 1/08* (2013.01); *B60L 2240/545* (2013.01)
(58) Field of Classification Search
　　CPC ....... B60L 1/08; B60L 2240/545; B60L 58/27
　　See application file for complete search history.

(56) References Cited

U.S. PATENT DOCUMENTS

| | | | | |
|---|---|---|---|---|
| 10,017,059 B2 * | 7/2018 | Kuribara | ................. | B60L 1/003 |
| 10,179,514 B2 * | 1/2019 | Murata | ............... | H01M 10/443 |
| 10,358,047 B2 * | 7/2019 | Murata | ..................... | B60L 1/02 |
| 10,446,887 B2 * | 10/2019 | Burrows | ........... | H01M 10/4207 |
| 10,906,376 B2 * | 2/2021 | Enomoto | ................ | F01P 7/161 |
| 11,021,072 B2 * | 6/2021 | Yamanaka | .......... | B60W 30/194 |

(Continued)

FOREIGN PATENT DOCUMENTS

| | | |
|---|---|---|
| CN | 102627073 | 8/2012 |
| CN | 107264336 | 10/2017 |

(Continued)

OTHER PUBLICATIONS

Japanese Notice of Allowance for Japanese Patent Application No. 2022-059636 mailed Jan. 9, 2024.

(Continued)

*Primary Examiner* — Jeffrey J Restifo

(74) *Attorney, Agent, or Firm* — Amin, Turocy & Watson, LLP

(57) ABSTRACT

A temperature adjusting device includes a temperature adjusting circuit configured to circulate a thermal medium, a first temperature sensor configured to measure a temperature of the thermal medium, a battery thermally connected to the temperature adjusting circuit, a second temperature sensor configured to measure a temperature of the battery, a heat generating instrument thermally connected to the temperature adjusting circuit, and a control device configured to control the heat generating instrument, the control device including a thermal medium heating mode configured to generate excessive heat from the heat generating instrument on the basis of measurement results of the first temperature sensor and the second temperature sensor.

8 Claims, 6 Drawing Sheets

(56) References Cited

U.S. PATENT DOCUMENTS

| | | | |
|---|---|---|---|
| 11,271,417 B2 * | 3/2022 | Lee | H02J 7/00712 |
| 11,890,914 B2 * | 2/2024 | Mazaira | B60L 58/27 |
| 12,221,013 B2 * | 2/2025 | Falcone | B60L 58/18 |
| 12,237,795 B2 * | 2/2025 | Penne | B60L 3/0061 |
| 12,246,580 B2 * | 3/2025 | Ogaki | B60H 1/00899 |
| 12,252,032 B2 * | 3/2025 | Hermann | H02J 7/0069 |
| 2012/0200241 A1 | 8/2012 | Kojima et al. | |
| 2015/0101789 A1 * | 4/2015 | Enomoto | B60H 1/039 |
| | | | 236/35 |
| 2016/0332505 A1 * | 11/2016 | Yamanaka | B60H 1/143 |
| 2017/0210204 A1 * | 7/2017 | Fuse | B60H 1/06 |
| 2017/0282751 A1 | 10/2017 | Fukuchi et al. | |
| 2019/0348724 A1 * | 11/2019 | Satoh | H02J 7/04 |
| 2020/0290427 A1 * | 9/2020 | Watanabe | H01M 10/613 |
| 2023/0249584 A1 * | 8/2023 | Ogaki | H10K 71/70 |
| | | | 701/22 |
| 2023/0253644 A1 * | 8/2023 | Kouchi | B60L 50/60 |
| 2024/0080943 A1 * | 3/2024 | Kikuchi | H05B 1/0236 |
| 2024/0262249 A1 * | 8/2024 | Numata | G16Y 10/40 |
| 2024/0283056 A1 * | 8/2024 | Nakano | B60L 58/27 |
| 2024/0286527 A1 * | 8/2024 | Suzuki | B60L 58/27 |
| 2024/0405313 A1 * | 12/2024 | Reddy | H01M 10/617 |
| 2025/0074256 A1 * | 3/2025 | Swantek | B60L 58/26 |

FOREIGN PATENT DOCUMENTS

| | | |
|---|---|---|
| CN | 113691193 | 11/2021 |
| JP | 08-022845 | 1/1996 |
| JP | 2010-064651 | 3/2010 |
| JP | 2020-013726 | 1/2020 |
| JP | 2020-185829 | 11/2020 |

OTHER PUBLICATIONS

Chinese Office Action for Chinese Patent Application No. 202310280653.9 mailed Dec. 19, 2025.

* cited by examiner

FIG. 3

| Batt Temperature/State | | LLC Temperature | -30°C~0°C | 0°C~30°C | 30°C~60°C以上 |
|---|---|---|---|---|---|
| [Heating] -30°C to 0°C | Leaving (outdoor air<0°C) | Plug in | Thermal medium heating mode (surplus heat generation ON, radiator OFF) | Thermal medium circulation mode (surplus heat generation OFF, radiator OFF) | Thermal medium cooling mode (surplus heat generation OFF, radiator ON) |
| | | Non Plug | Thermal medium heating mode (surplus heat generation ON, radiator OFF) | No situation | No situation |
| | Traveling | | Thermal medium heating mode (surplus heat generation ON, radiator OFF) | Thermal media circulation mode (surplus heat generation OFF, radiator OFF) | Thermal media circulation mode (surplus heat generation OFF, radiator OFF) |
| [Heating] 0°C to 50°C | Leaving | Plug in | Thermal media circulation mode (surplus heat generation OFF, radiator OFF) | Thermal media circulation mode (surplus heat generation OFF, radiator OFF) | Thermal media circulation mode (surplus heat generation OFF, radiator OFF) |
| | | Non Plug | No operation | ← | No situation |
| | Traveling | | Thermal medium heating mode (surplus heat generation ON, radiator OFF) | Thermal media circulation mode (surplus heat generation OFF, radiator OFF) | Thermal medium cooling mode (surplus heat generation OFF, radiator ON) |
| [Cooling] 50°C to 60°C or more | Leaving | Plug in | Thermal medium cooling mode (surplus heat generation OFF, radiator ON) | Thermal medium cooling mode (surplus heat generation OFF, radiator ON) | Thermal medium cooling mode (surplus heat generation OFF, radiator ON) |
| | | Non Plug | No operation (keep temperature, warming) | ← | ← |
| | Traveling | | Thermal medium cooling mode (surplus heat generation OFF, radiator ON) | Thermal medium cooling mode (surplus heat generation OFF, radiator ON) | Thermal medium cooling mode (surplus heat generation OFF, radiator ON) |

FIG. 5

| | Traveling | | | Charging (connector connecting state) | | |
|---|---|---|---|---|---|---|
| | Driving | Stopping | Regeneration | Charging | Charge stopping | |
| Inverter | Non-efficiency | No-load heat generation | Non-efficiency | No-load heat generation | No-load heat generation | |
| Motor | Non-efficiency | — | Non-efficiency | — | — | |
| Charger | — | — | — | Heat generation for efficiency extent | — | |
| Notes | Temperature range T1 | Temperature range T1 | Temperature ranges T1, T2 | Temperatures T1, T2 Pre-heating is also included | | |

TEMPERATURE ADJUSTING DEVICE AND VEHICLE

CROSS-REFERENCE TO RELATED APPLICATION

Priority is claimed on Japanese Patent Application No. 2022-059636, filed Mar. 31, 2022, the content of which is incorporated herein by reference.

BACKGROUND OF THE INVENTION

Field of the Invention

The present invention relates to a temperature adjusting device and a vehicle.

Description of Related Art

In recent years, in order to ensure access to affordable, reliable, sustainable and advanced energy for more people, research and development have been carried out on secondary batteries that contribute to energy efficiency.

Japanese Unexamined Patent Application, First Publication No. 2020-13726 discloses a power supply control system for a moving body comprising a power storage device mounted on a moving body and chargeable by an external power feeding device, a temperature adjusting unit configured to adjust a temperature of the power storage device, and a temperature control unit configured to monitor a temperature of the power storage device and control a temperature of the power storage device using the temperature adjusting unit. The temperature adjusting unit includes a heating unit such as a heater or the like, and a cooling unit such as a fan, a refrigerating cycle, or the like.

SUMMARY OF THE INVENTION

Incidentally, in a technology related to a secondary battery, the weight and costs of temperature adjusting devices become an issue. In particular, in vehicles loaded with large-capacity batteries in recent years, the temperature adjusting devices as described above tend to be larger. In addition, in many cases, heating units such as heaters or the like of the temperature adjusting devices have high voltages and require safety protection.

An aspect of the present application is directed to accomplishing a reduction in size and weight of a temperature adjusting device of a battery. By extension, this contributes to energy efficiency.

A temperature adjusting device and a vehicle according to the present invention employ the following configurations.

(1) A temperature adjusting device according to an aspect of the present invention includes a temperature adjusting circuit configured to circulate a thermal medium; a first temperature sensor configured to measure a temperature of the thermal medium; a battery thermally connected to the temperature adjusting circuit; a second temperature sensor configured to measure a temperature of the battery; a heat generating instrument thermally connected to the temperature adjusting circuit; and a control device configured to control the heat generating instrument, the control device including a thermal medium heating mode configured to generate excessive heat from the heat generating instrument on the basis of measurement results of the first temperature sensor and the second temperature sensor.

(2) In the aspect according to the above-mentioned (1), the heat generating instrument may include a driving device configured to drive a motor.

(3) In the aspect of the above-mentioned (2), in the thermal medium heating mode, the control device may operate the driving device non-efficiently during power running of the motor.

(4) In the aspect of the above-mentioned (2) or (3), in the thermal medium heating mode, the control device may operate the driving device non-efficiently during regeneration of the motor.

(5) In the aspects of the above-mentioned (2) to (4), in the thermal medium heating mode, the control device may operate the driving device with no load while the motor is stopped.

(6) In the aspects of the above-mentioned (1) to (5), the heat generating instrument may include a charging device electrically connected to an external power supply and configured to charge the battery.

(7) In the aspects of the above-mentioned (1) to (6), an insulating member configured to insulate the battery from the outdoor air may be further provided.

(8) A vehicle according to an aspect of the present invention includes the temperature adjusting device according to the aspects of the above-mentioned (1) to (7).

According to the aspects of the above-mentioned (1) to (8), since the heat generating instrument thermally connected to the temperature adjusting circuit excessively generates heat to warm the battery, it is possible to reduce or remove the heating unit of the temperature adjusting device. Accordingly, it is possible to accomplish a reduction in size and weight of the temperature adjusting device of the battery.

BRIEF DESCRIPTION OF THE DRAWINGS

FIG. 3 is a view for describing each temperature adjusting mode by a control device according to the embodiment.

FIG. 5 is a view showing a pattern of surplus heat generation of a heat generating instrument during traveling and charging of the vehicle when in a thermal medium heating mode according to the embodiment.

DETAILED DESCRIPTION OF THE INVENTION

Hereinafter, an embodiment of the present invention will be described with reference to the accompanying drawings.

Figure 1:
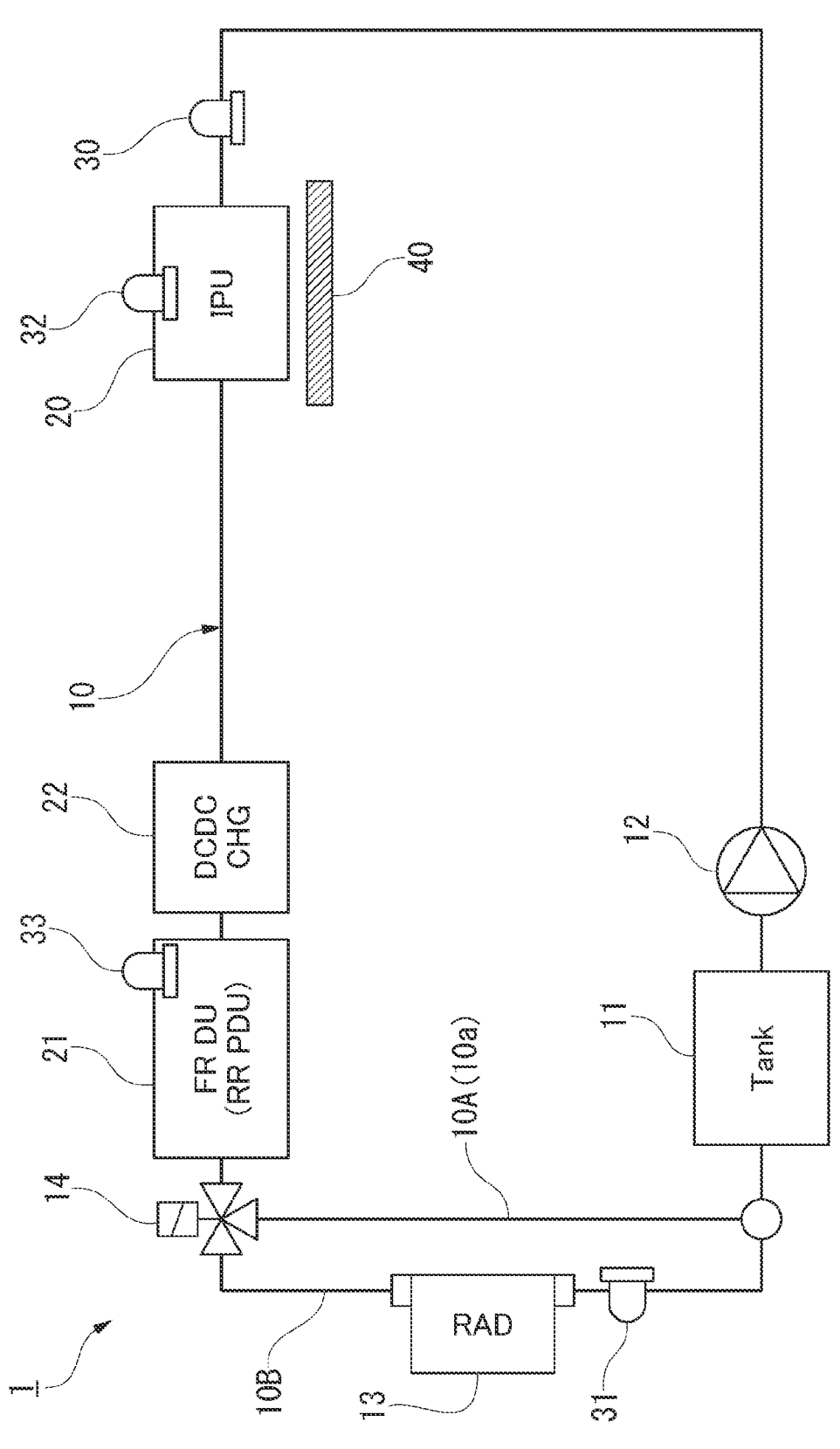
FIG. 1 is a circuit diagram showing a configuration of a temperature adjusting device according to an embodiment.

FIG. 1 is a circuit diagram showing a configuration of a temperature adjusting device 1 according to an embodiment.

The temperature adjusting device 1 is mounted in a vehicle (not shown). The vehicle may be an electric vehicle having only a motor serving as a driving source, or may be a hybrid vehicle having a motor and an internal combustion engine.

As shown in FIG. 1, the temperature adjusting device 1 includes a temperature adjusting circuit 10 configured to circulate a thermal medium.

A battery (IPU) 20 is thermally connected to the temperature adjusting circuit 10. In addition, a driving device (FR DU, RR PDU) 21 or a charging device (DCDC CHG) 22 is thermally connected to the temperature adjusting circuit 10 as a heat generating instrument. The heat generating instrument (the driving device 21, the charging device 22) is disposed downstream from the battery 20 in the temperature adjusting circuit 10.

The battery 20 supplies electric power to at least one of an electronic system, an air-conditioning system, and a driving system of the vehicle. The battery 20 is a secondary battery that is chargeable and dischargeable. As the secondary battery, a solid-state battery having a wide management temperature range in charging and discharging is preferable. The solid-state battery is a battery filled with a solid electrolyte between a positive electrode and a negative electrode with no electrolytic liquid. Further, the secondary battery may be a known lithium ion battery or the like having an electrolytic liquid.

The driving device 21 is electrically connected to the battery 20, and drives a motor of the vehicle. The driving device 21 includes an inverter (electric power conversion device) configured to convert direct current electric power into alternating current electric power and convert alternating current electric power into direct current electric power. The charging device 22 is electrically connected to the battery 20, and charges the battery 20 when electrically connected to an external power supply (not shown). The charging device 22 includes a DC/DC converter configured to boost or drop a direct current voltage.

The temperature adjusting circuit 10 includes a reservoir tank 11, a pump 12, and a radiator (RAD) 13. The reservoir tank 11 stores a thermal medium and injects the thermal medium into the temperature adjusting circuit 10. The thermal medium is water, radiator liquid, coolant liquid, or the like. The pump 12 is disposed downstream from the reservoir tank 11 in the temperature adjusting circuit 10. The pump 12 circulates the thermal medium in the temperature adjusting circuit 10, and supplies the thermal medium into the battery 20, the charging device 22, and the driving device 21 in sequence.

The radiator 13 is disposed downstream from the driving device 21 in the temperature adjusting circuit 10. The radiator 13 exchanges heat between the thermal medium and the outdoor air. In the temperature adjusting circuit 10, a bypass flow channel 10a is connected to a downstream side of the driving device 21 and an upstream side of the radiator 13 via a flow channel switching valve 14. The bypass flow channel 10a connects an upstream side and a downstream side of the radiator 13 in the temperature adjusting circuit 10.

The flow channel switching valve 14 forms a first temperature adjusting circuit 10A configured to circulate a thermal medium without going through the radiator 13 and a second temperature adjusting circuit 10B configured to circulate the thermal medium through the radiator 13. Further, when an opening/closing device (for example, an active grill shutter) configured to open and close a ventilating hole through which the radiator 13 takes in the outdoor air is provided, the flow channel switching valve 14 and the bypass flow channel 10a may not be provided.

In the embodiment, the first temperature adjusting circuit 10A is a circuit in which the thermal medium sent from the pump 12 is supplied into the battery 20, the charging device 22, and the driving device 21 in sequence, and then returns to the reservoir tank 11 through the bypass flow channel 10a. In addition, in the embodiment, the second temperature adjusting circuit 10B is a circuit in which the thermal medium sent from the pump 12 is supplied into the battery 20, the charging device 22, and the driving device 21 in sequence, and then is cooled by the radiator 13 to return to the reservoir tank 11.

The temperature adjusting device 1 of the above-mentioned configuration includes a plurality of temperature sensors 30, 31, 32 and 33. The temperature sensor is installed at an inlet of the battery 20 in the temperature adjusting circuit 10 and measures a temperature of the thermal medium. In addition, the temperature sensor 31 is installed at an outlet of the radiator 13 in the temperature adjusting circuit 10 and measures a temperature of the thermal medium. In addition, the temperature sensor 32 is installed in the battery 20 and measures a temperature of the battery 20. In addition, the temperature sensor 33 is installed in the driving device 21 and measures a temperature of the driving device 21.

In addition, the temperature adjusting device 1 of the above-mentioned configuration includes an insulating member 40 configured to insulate the battery 20 from the outdoor air. The insulating member 40 is, for example, a plate-shaped member configured to cover a bottom surface of the battery 20 installed on a bottom section of the vehicle. Accordingly, the battery 20 can be kept warm.

Next, a control system of the temperature adjusting device 1 of the above-mentioned configuration will be described.

Figure 2:
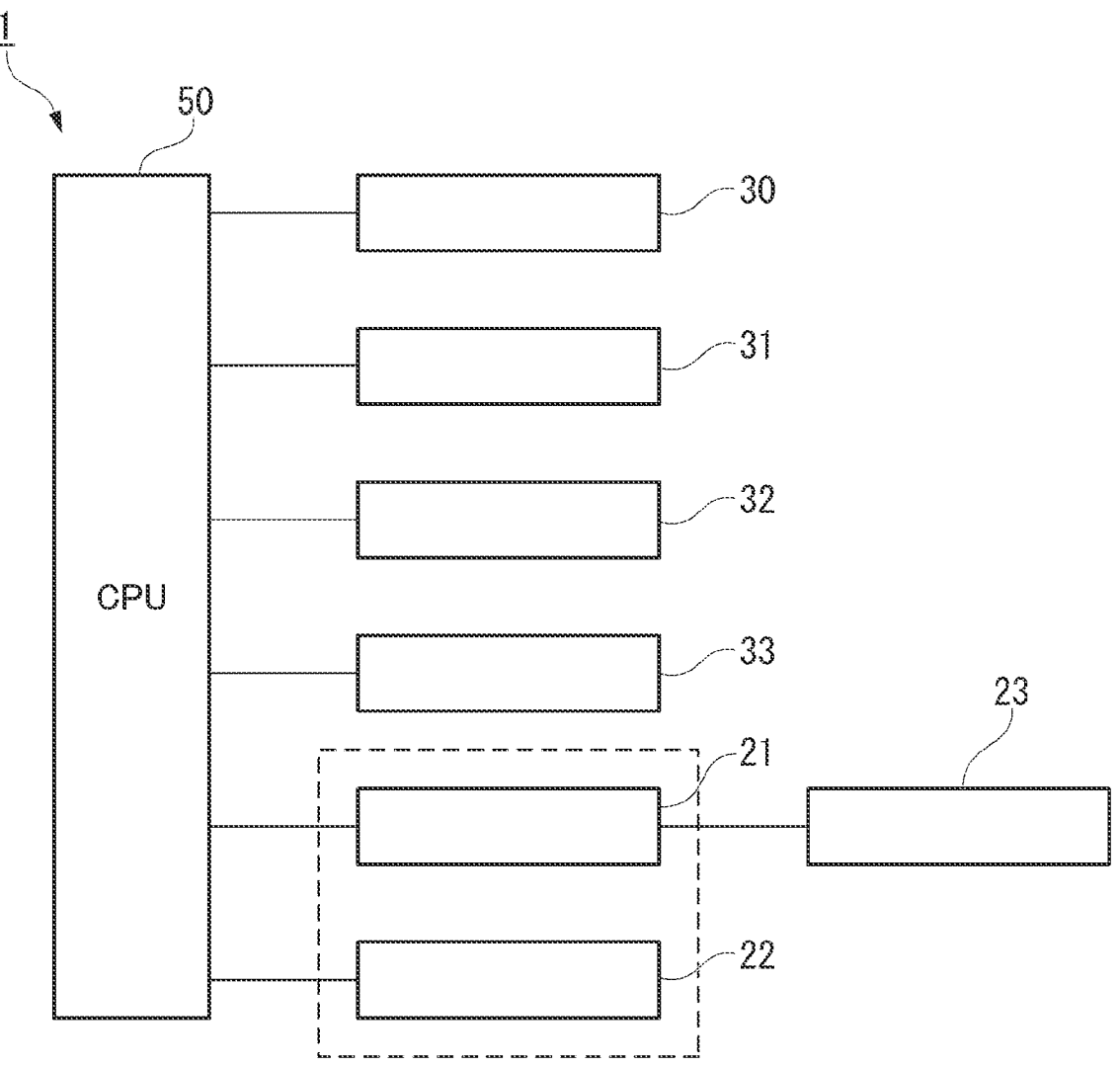
FIG. 2 is a block diagram showing a control system of the temperature adjusting device according to the embodiment.

FIG. 2 is a block diagram showing a control system of the temperature adjusting device 1 according to the embodiment.

As shown in FIG. 2, the temperature adjusting device 1 includes a control device 50 electrically connected to the plurality of temperature sensors 30, 31, 32 and 33 and electrically connected to the battery 20 and the heat generating instruments (the driving device 21, the charging device 22). The control device 50 includes a plurality of temperature adjusting modes of heating, warming, maintaining temperature or cooling the battery 20.

FIG. 3 is a view for describing each temperature adjusting mode by the control device 50 according to the embodiment.

As shown in FIG. 3, the control device 50 switches a temperature adjusting mode on the basis of the temperature sensor 30 (an LLC temperature) and the temperature sensor 32 (a Batt temperature). The temperature adjusting mode includes a thermal medium heating mode, a thermal medium circulating mode, and a thermal medium cooling mode.

The thermal medium heating mode is a mode of heating a low temperature battery 20. During the thermal medium heating mode, the control device 50 operates the flow channel switching valve 14, and switches the temperature adjusting circuit 10 to the first temperature adjusting circuit 10A (radiator OFF). In addition, in the thermal medium heating mode, the control device 50 causes the heat generating instrument (the driving device 21) thermally connected to the temperature adjusting circuit 10 to generate heat excessively (surplus heat generation ON). Further, the surplus heat generation of the heat generating instrument will be described below.

The thermal medium circulating mode is a mode of maintaining a temperature of the battery 20 within a management temperature range. During the thermal medium circulating mode, the control device 50 operates the flow channel switching valve 14 and switches the temperature adjusting circuit 10 to the first temperature adjusting circuit 10A (radiator OFF). In addition, in the thermal medium circulating mode, the control device 50 operates the heat generating instruments (the driving device 21, the charging device 22) thermally connected to the temperature adjusting circuit 10 as usual, and does not generate heat excessively (surplus heat generation OFF).

The thermal medium cooling mode is a mode of cooling a high temperature battery 20. During the thermal medium cooling mode, the control device 50 operates the flow channel switching valve 14 and switches the temperature adjusting circuit 10 to the second temperature adjusting circuit 10B (radiator ON). In addition, in the thermal medium cooling mode, the control device 50 operates the heat generating instruments (the driving device 21, the charging device 22) thermally connected to the temperature adjusting circuit 10 normally, and does not generate heat excessively (surplus heat generation OFF).

Figure 4:
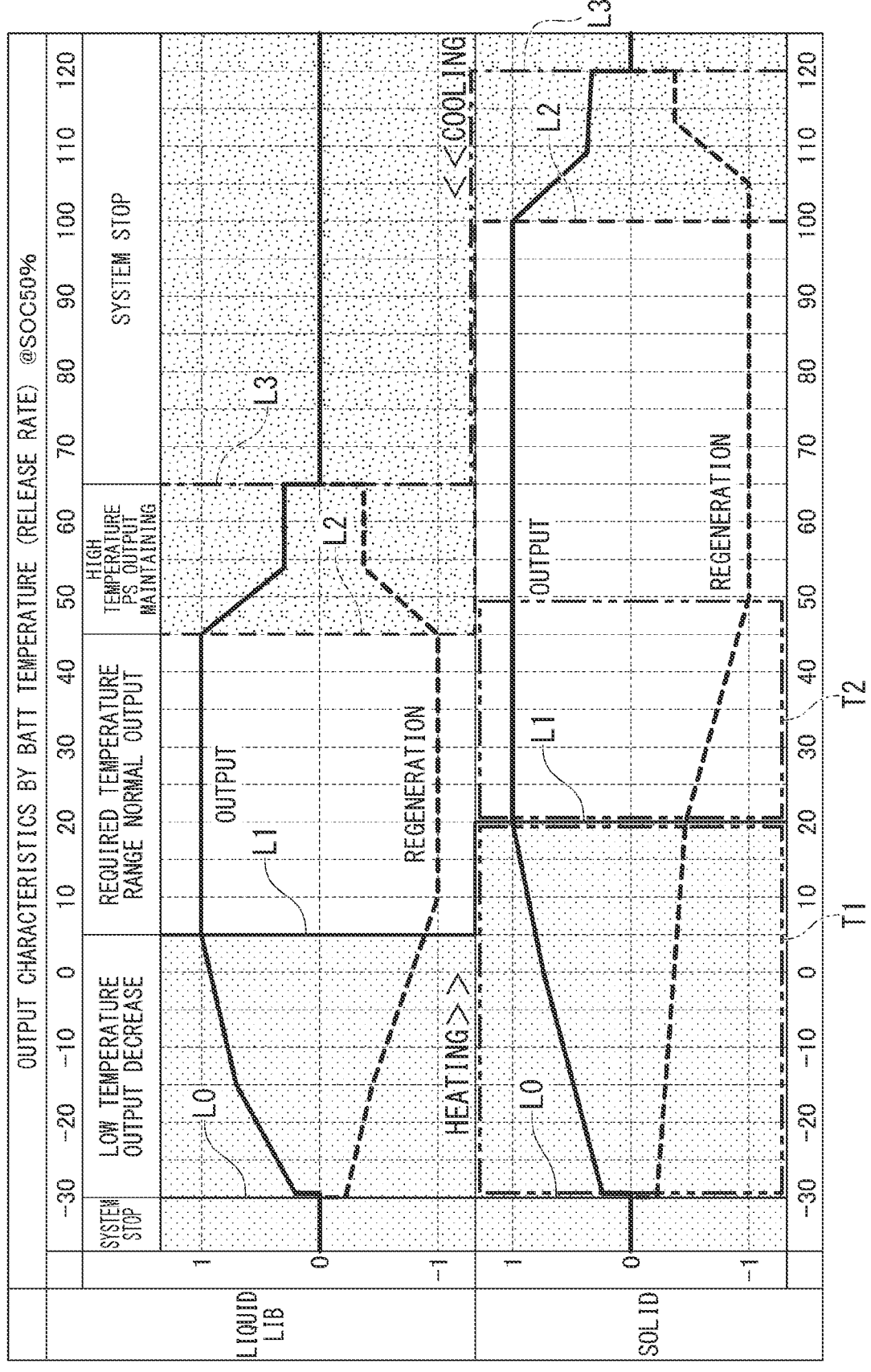
FIG. 4 is a graph showing a relation between output characteristics and temperatures of a battery according to the embodiment.

FIG. 4 is a graph showing a relation between output characteristics and temperatures of the battery 20 according to the embodiment. Further, in FIG. 4, output characteristics in a case the battery 20 is a lithium ion battery (liquid LIB) and in a case the battery 20 is a solid-state battery (solid) (when states of charge (SOC) are 50% at both cases) are compared and shown. FIG. 5 is a view showing a pattern of surplus heat generation of the heat generating instrument upon traveling and charging of the vehicle in the thermal medium heating mode according to the embodiment.

Reference sign L0 shown in FIG. 4 represents a boundary line between a system stop state in which the battery 20 barely works at an extremely low temperature and a low temperature output decrease state in which the battery 20 works but does not satisfy the required output due to a low temperature. In addition, reference sign L1 shown in FIG. 4 represents a boundary line between the above-mentioned low temperature output decrease state and a normal output state in which the battery 20 can output the required output within a required temperature range (i.e., a management temperature range).

Reference sign L2 shown in FIG. 4 represents a boundary line between the above-mentioned normal output state and a high temperature output holding state in which the battery 20 works but maintains output at a high temperature with controlled power save (PS). In addition, reference sign L3 shown in FIG. 4 represents a boundary line between the above-mentioned high temperature output holding state and a system stop state in which the battery 20 barely works at an extremely high temperature.

As shown in FIG. 4, in a case the battery 20 is the solid-state battery (in the embodiment), the temperature range (i.e., the management temperature range) in which it is in the normal output state between the boundary lines L1 and L2 is wider than in a case the battery 20 is the lithium ion battery. Specifically, in the example shown in FIG. 4, when the battery 20 is the solid-state battery, 20° C. to 100° C. is a management temperature range in which it is in normal output. In addition, in the example shown in FIG. 4, in a case the battery 20 is the lithium ion battery, 5° C. to 45° C. is a management temperature range in which it is in is normal output.

In the above-mentioned thermal medium heating mode, as shown in FIG. 5, the heat generating instrument (the driving device 21) generates heat excessively according to each situation of a traveling state (driving, stopping, and regeneration) and a charging state (charging and charge stopping) of the vehicle.

Specifically, in the thermal medium heating mode, the control device 50 non-efficiently operates the driving device

21 during power running (driving) of a motor 23. Accordingly, driving device 21 can generate heat excessively and heat the thermal medium. The non-efficiency operation of the driving device 21 is performed within a temperature range T1 in which the battery 20 is in a low temperature output decrease state between the boundary lines L0 and L1 as shown in FIG. 4.

Further, the non-efficiency operation of the driving device 21 is control of driving the motor 23 at a phase current different from a phase current used in maximum torque, current control or maximum efficiency control, i.e., a phase current (d-axis current, q-axis current) that minimizes the current value or loss when a predetermined driving force (a torque on a constant torque curve) is generated. In the non-efficiency operation, it is also referred to as strong field control because a value of the d-axis current becomes larger in the positive direction (almost positive value) than the value of the d-axis current in the conventional efficiency control. In the non-efficiency operation, for example, details are disclosed in Japanese Unexamined Patent Application, First Publication No. 2017-189079, which is a prior application filed by the present application.

In addition, in the thermal medium heating mode, the control device 50 operates the driving device 21 with no load during stopping of the motor 23 (no-load heat generation). Further, the no-load operation of the driving device 21 is control that does not rotate the motor 23 but operates the driving device 21 so as to produce a predetermined torque. Accordingly, it is possible to generate excessive heat from the driving device 21 to heat the thermal medium. The no-load operation of the driving device 21 is performed within the temperature range T1 shown in FIG. 4.

In addition, in the thermal medium heating mode, the control device 50 operates the driving device 21 with non-efficiency operation during regeneration of the motor 23. Further, the non-efficiency operation of the driving device 21 during regeneration is control that consumes excess electric power generated in the vehicle in the non-efficiency region of the motor 23 like in the power running. Accordingly, the driving device 21 can generate excessive heat and heat the thermal medium. The non-efficiency operation of the driving device 21 is performed within the temperature range T1 shown in FIG. 4 and a temperature range T2 which is a normal output state of the battery 20 between the boundary lines L1 and L2 and which is until the output of the regeneration (or the output limit, or also referred to as acceptability) is maximized (shown by −1 in FIG. 4) from the boundary line L1.

In addition, in the thermal medium heating mode, the control device 50 operates the driving device 21 with no load during charging of the battery 20 (no-load heat generation). Accordingly, the driving device 21 can generate heat excessively and heat the thermal medium. Further, the thermal medium can be heated also according to heat generation for efficiency extent of the charging device 22 during charging of the battery 20. The no-load operation of the driving device 21 and the heat generation for efficiency of the charging device 22 are performed even during pre-warming up of air-conditioning equipment of the vehicle within the temperature ranges T1 and T2 shown in FIG. 4. The pre-warming up of the air-conditioning equipment is to warm up the passenger compartment in advance by remote control.

In addition, in the thermal medium heating mode, the control device 50 operates the driving device 21 with no load during the charge stopping of the battery 20 (no-load heat generation). Accordingly, the driving device 21 can generate heat excessively and heat the thermal medium. The no-load operation of the driving device 21 is performed even during the pre-warming up of the air-conditioning equipment of the vehicle within the temperature ranges T1 and T2 shown in FIG. 4. Further, the amount of electric power consumed by the battery 20 in the air-conditioning equipment is charged by repeating the above-mentioned charging of the battery 20, and the battery 20 reaches a full charging state.

As shown in FIG. 3, the control device 50 of the above-mentioned configuration switches the temperature adjusting mode on the basis of the measurement results of the temperature sensor 30 (LLC temperature) and the temperature sensor 32 (Batt temperature). For example, in a case the temperature sensor 30 (LLC temperature) is −30° C. to 0° C. and the temperature sensor 32 (Batt temperature) is −30° C. to 0° C., in addition, in a case the temperature sensor 30 (LLC temperature) is −30° C. to 0° C. and the temperature sensor 32 is 0° C. to 50° C. (Batt temperature), and further, in a case the vehicle is traveling, the control device 50 switches to the thermal medium heating mode and heats the battery 20. During the thermal medium heating mode, as described above, the heat generating instrument (the driving device 21) generates heat excessively according to each situation of the traveling state (driving, stopping, and regeneration) and the charging state (charging and charge stopping) of the vehicle.

According to the configuration, since it is possible to generate heat excessively from the heat generating instrument (the driving device 21) thermally connected to the temperature adjusting circuit 10 and heat the battery 20, as shown in FIG. 1, a heating unit such as a heater or the like dedicated to the thermal medium can be eliminated. Accordingly, it is possible to accomplish reduction in size and weight of the temperature adjusting device 1 of the battery 20.

In this way, the temperature adjusting device 1 according to the above-mentioned embodiment includes the temperature adjusting circuit 10 configured to circulate a thermal medium, the temperature sensor 30 (first temperature sensor) configured to measure a temperature of the thermal medium, the battery 20 thermally connected to the temperature adjusting circuit 10, the temperature sensor 32 (second temperature sensor) configured to measure a temperature of the battery 20, the heat generating instruments (the driving device 21, the charging device 22) thermally connected to the temperature adjusting circuit 10, and the control device 50 configured to control the heat generating instruments, the control device 50 including a thermal medium heating mode of generating heat from the heat generating instrument (the driving device 21) excessively on the basis of the measurement results of the temperature sensor 30 and the temperature sensor 32. According to the configuration, it is possible to accomplish reduction in size and weight of the temperature adjusting device 1 of the battery 20.

In addition, in the embodiment, the heat generating instrument includes the driving device 21 configured to drive the motor 23. According to the configuration, it is possible to heat the battery 20 via the thermal medium heated by the heat generation of the driving device 21.

In addition, in the embodiment, in the thermal medium heating mode, the control device 50 operates the driving device 21 non-efficiently during power running of the motor 23. According to the configuration, it is possible to generate excessive heat from the driving device 21 and heat the battery 20, during power running of the motor 23.

In addition, in the embodiment, in the thermal medium heating mode, the control device 50 operates the driving device 21 non-efficiently during regeneration of the motor 23. According to the configuration, it is possible to generate excessive heat from the driving device 21 and heat the battery 20, during the regeneration of the motor 23.

In addition, in the embodiment, in the thermal medium heating mode, the control device 50 operates the driving device 21 with no load during stopping of the motor 23. According to the configuration, it is possible to generate excessive heat from the driving device 21 and heat the battery 20, during stopping of the motor 23.

In addition, in the embodiment, the heat generating instrument includes the charging device 22 electrically connected to the external power supply and configured to charge the battery 20. According to the configuration, it is possible to heat the battery via the thermal medium heated by the heat generation of the charging device 22.

In addition, in the embodiment, the insulating member 40 configured to insulate the battery 20 from the outdoor air is provided. According to the configuration, it is possible to maintain the temperature of the battery 20 warm and prevent the warmed battery 20 from getting cold.

Figure 6:
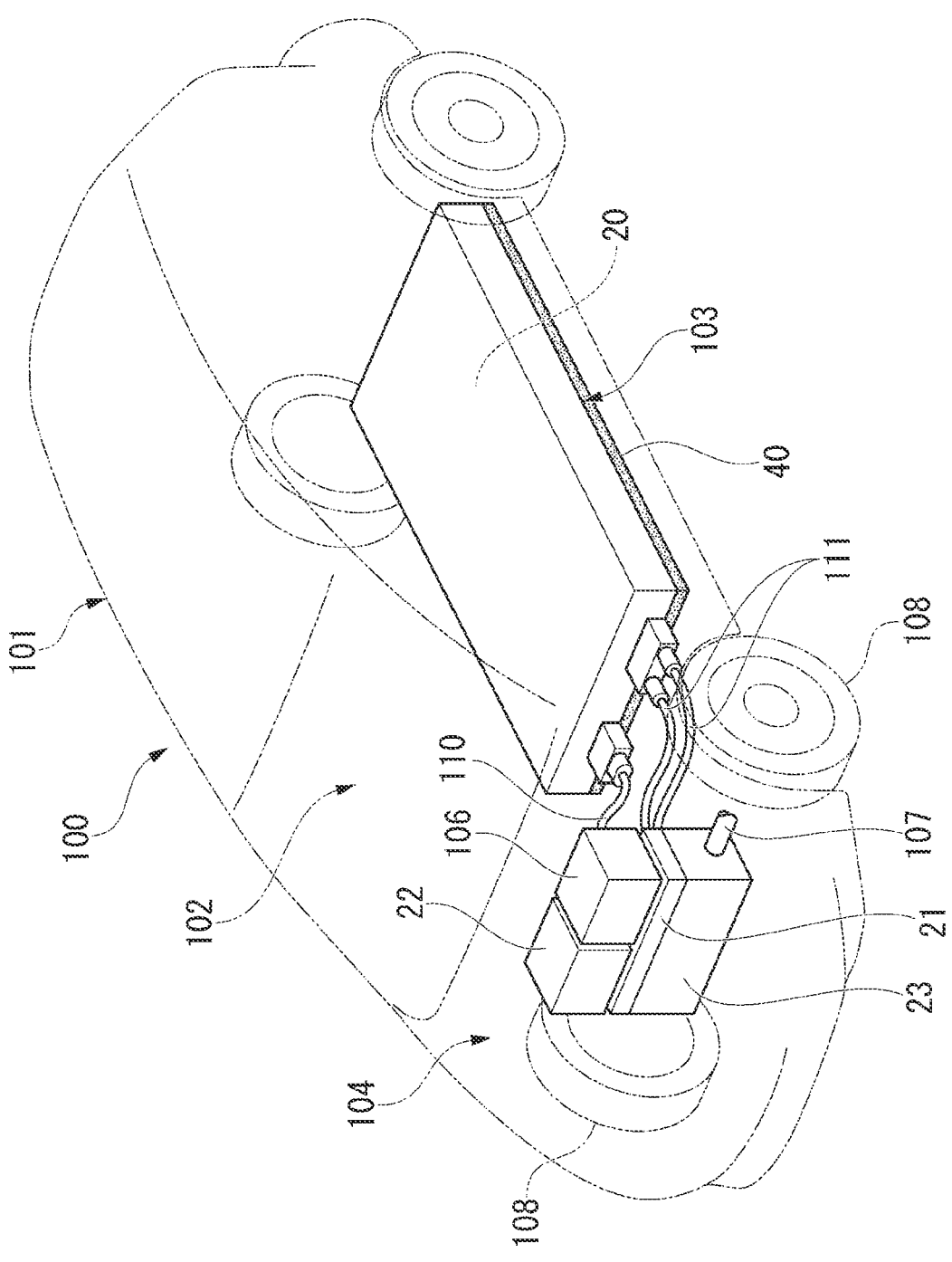
FIG. 6 is a perspective view showing a schematic configuration of the vehicle according to the embodiment.

FIG. 6 is a perspective view showing a schematic configuration of a vehicle 100 according to the embodiment.

In a vehicle body 101 of the vehicle 100, a battery case 103 configured to accommodate the battery 20 is mounted in an underfloor portion of a passenger compartment 102. The insulating member 40 is adhered to a bottom section of the battery case 103. A motor room 104 is provided in a front section of the vehicle 100. A motor 23, a driving device 21, a branch unit 106, a charging device 22, and the like, are provided in the motor room 104.

A rotational driving force of the motor 23 is transmitted to a shaft 107. A front wheel 108 of the vehicle 100 is connected to both end portions of the shaft 107. The driving device 21 is disposed above the motor 23 and directly fastened and fixed to a case of the motor 23. The driving device 21 is electrically connected to a connector of the battery case 103 by a power supply cable 111. In addition, the driving device 21 is electrically connected to the motor 23 by, for example, a three-phase pass bar. The driving device 21 controls driving of the motor 23 using electric power supplied from the battery 20.

The branch unit 106 and the charging device 22 are disposed laterally in parallel. The branch unit 106 and the charging device 22 are disposed above the driving device 21. The branch unit 106 and the charging device 22 are disposed while being separated from the driving device 21. The branch unit 106 and the battery case 103 are electrically connected by a cable 110 having connectors on both ends.

The branch unit 106 is electrically connected to the charging device 22. The charging device 22 is connected to a conventional external power supply such as a domestic power source or the like, and performs charging to the battery 20. The charging device 22 and the branch unit 106 are electrically connected by a cable (not shown) having connectors on both ends.

Since the vehicle 100 includes the above-mentioned temperature adjusting device 1, it is possible to accomplish reduction in size and weight of the temperature adjusting device 1 of the battery 20. In this way, since the temperature adjusting device 1 is reduced in size and weight, an electric mileage is increased and vehicle efficiency is improved.

Hereinabove, while preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

For example, while a heating unit such as a heater or the like dedicated to a thermal medium is eliminated from the temperature adjusting circuit 10 of the temperature adjusting device 1 in the embodiment, the heating unit and the surplus heat generation of the above-mentioned heat generating instrument may be combined. In this case, since the heating unit can be reduced by the surplus heat generation of the heat generating instrument, it is possible to accomplish reduction in size and weight of the temperature adjusting device 1 of the battery 20.

What is claimed is:

1. A temperature adjusting device comprising:

a temperature adjusting circuit configured to circulate a thermal medium;

a first temperature sensor configured to measure a temperature of the thermal medium;

a battery thermally connected to the temperature adjusting circuit;

a second temperature sensor configured to measure a temperature of the battery;

a heat generating instrument thermally connected to the temperature adjusting circuit; and a control device configured to control the heat generating instrument, wherein the control device includes a thermal medium heating mode configured to generate excessive heat from the heat generating instrument by non-efficiency operation or no load operation on the basis of measurement results of the first temperature sensor and the second temperature sensor.

2. The temperature adjusting device according to claim 1, wherein the heat generating instrument includes a driving device configured to drive a motor.

3. The temperature adjusting device according to claim 2, wherein, in the thermal medium heating mode, the control device operates the driving device non-efficiently during power running of the motor.

4. The temperature adjusting device according to claim 2, wherein, in the thermal medium heating mode, the control device operates the driving device non-efficiently during regeneration of the motor.

5. The temperature adjusting device according to claim 2, wherein, in the thermal medium heating mode, the control device operates the driving device with no load while the motor is stopped.

6. The temperature adjusting device according to claim 1, wherein the heat generating instrument includes a charging device electrically connected to an external power supply and configured to charge the battery.

7. The temperature adjusting device according to claim 1, further comprising an insulating member configured to insulate the battery from outdoor air.

8. A vehicle comprising the temperature adjusting device according to claim 1.

* * * * *